(12) United States Patent
Jewell et al.

(10) Patent No.: US 11,078,556 B2
(45) Date of Patent: Aug. 3, 2021

(54) METHOD FOR PRODUCTION OF A COMPOSITE MATERIAL USING EXCESS OXIDANT

(71) Applicant: Coogee Titanium Pty Ltd, Kwinana (AU)

(72) Inventors: Daniel Jewell, Kwinana (AU); Peter Duxson, Kwinana (AU); Christian Doblin, Kwinana (AU)

(73) Assignee: Coogee Titanium Pty Ltd, Western (AU)

( * ) Notice: Subject to any disclaimer, the term of this patent is extended or adjusted under 35 U.S.C. 154(b) by 130 days.

(21) Appl. No.: 15/707,481

(22) Filed: Sep. 18, 2017

(65) Prior Publication Data

US 2018/0010209 A1 Jan. 11, 2018

Related U.S. Application Data

(60) Division of application No. 15/637,256, filed on Jun. 29, 2017, now Pat. No. 9,840,753, which is a
(Continued)

(30) Foreign Application Priority Data

Aug. 14, 2015 (AU) ................ 2015903277

(51) Int. Cl.
*C22C 32/00* (2006.01)
*C22B 5/14* (2006.01)
(Continued)

(52) U.S. Cl.
CPC ......... *C22B 5/14* (2013.01); *C22B 5/04* (2013.01); *C22B 21/00* (2013.01); *C22B 34/12* (2013.01); *C22B 34/22* (2013.01); *C22C 32/0089* (2013.01)

(58) Field of Classification Search
None
See application file for complete search history.

(56) References Cited

U.S. PATENT DOCUMENTS 3,746,535 A 7/1973 Brandstatter
3,779,742 A * 12/1973 Fehling .............. F24V 30/00
75/414

(Continued)

FOREIGN PATENT DOCUMENTS

CN 85100812 A 9/1986
CN 1522308 A 8/2004
(Continued)

OTHER PUBLICATIONS

English translation of JP 2011-192711-A (originally published Jul. 17, 2011) from J-Plat Pat.*
(Continued)

*Primary Examiner* — George Wyszomierski
(74) *Attorney, Agent, or Firm* — Michael Best & Friedrich LLP

(57) ABSTRACT

A method of producing a composite material comprising: supplying a metal compound ($M_PC$) of a product metal ($M_P$) and a reductant (R) capable of reducing the metal compound ($M_PC$) of the product metal (MP) to a reactor; forming a composite material comprising a matrix of oxidised reductant ($R_O$) of the reductant (R), the product metal ($M_P$) dispersed in the matrix of oxidised reductant ($R_O$), and at least one of (i) one or more metal compounds ($M_PC_R$) of the metal compound ($M_PC$) in one or more oxidation states and (ii) the reductant (R); and recovering the composite material from the reactor, wherein the metal compound ($M_PC$) of the product metal ($M_P$) is fed to the reactor such that it is in excess relative to the reductant (R).

6 Claims, 4 Drawing Sheets

Related U.S. Application Data continuation of application No. PCT/AU2016/050746, filed on Aug. 12, 2016.

(51) Int. Cl.
*C22B 5/04* (2006.01)
*C22B 34/12* (2006.01)
*C22B 34/22* (2006.01)
*C22B 21/00* (2006.01)

(56) References Cited

U.S. PATENT DOCUMENTS

| | | | |
|---|---|---|---|
| 4,279,641 A * | 7/1981 | Skach, Jr. | C21C 7/0645 |
| | | | 264/6 |
| 4,738,389 A | 4/1988 | Moshier et al. | |
| 5,032,176 A | 7/1991 | Kametani et al. | |
| 5,078,789 A | 1/1992 | Abodishish et al. | |
| 5,098,471 A | 3/1992 | Abodishish | |
| 5,498,446 A | 3/1996 | Axelbaum et al. | |
| 5,589,274 A * | 12/1996 | Long | B64G 1/226 |
| | | | 428/213 |
| 5,641,424 A | 6/1997 | Ziolo et al. | |
| 5,958,106 A | 9/1999 | Armstrong et al. | |
| 6,194,083 B1 * | 2/2001 | Yasuda | C04B 35/488 |
| | | | 428/325 |
| 6,409,797 B2 | 6/2002 | Armstrong et al. | |
| 6,712,952 B1 | 3/2004 | Fray et al. | |
| 7,041,150 B2 | 5/2006 | Armstrong et al. | |
| 9,840,753 B2 | 12/2017 | Jewell et al. | |
| 2003/0059603 A1 * | 3/2003 | Gottfried | B82Y 25/00 |
| | | | 428/329 |
| 2004/0123700 A1 | 7/2004 | Zhou et al. | |
| 2007/0178163 A1 | 8/2007 | Kodas et al. | |
| 2008/0307925 A1 * | 12/2008 | Wellwood | C22B 5/14 |
| | | | 75/357 |

FOREIGN PATENT DOCUMENTS

| | | |
|---|---|---|
| CN | 101454467 | 6/2009 |
| CN | 100489128 C | 11/2009 |
| CN | 100557044 C | 11/2009 |
| CN | 102712966 | 10/2012 |
| CN | 102921953 | 2/2013 |
| EP | 1683877 | 7/2006 |
| GB | 694921 A | 7/1953 |
| GB | 827470 A | 2/1960 |
| JP | H0681051 | 3/1994 |
| JP | H0873906 A | 3/1996 |
| JP | 2000096160 A | 4/2000 |
| JP | 2001192711 A | 7/2001 |
| JP | 2002129250 A | 5/2002 |
| JP | 2002339006 | 11/2002 |
| JP | 2004283694 A | 10/2004 |
| JP | 2006045602 A | 2/2006 |
| JP | 2007523991 A | 8/2007 |
| JP | 2009132970 A | 6/2009 |
| KR | 20120074132 A | 7/2012 |
| WO | 2005028145 A2 | 3/2005 |
| WO | 2006010223 | 2/2006 |
| WO | 2006042360 | 4/2006 |
| WO | 2008067614 A1 | 12/2008 |
| WO | 2009054819 A1 | 4/2009 |
| WO | 2011137489 | 11/2011 |
| WO | 2013185153 A2 | 12/2013 |

OTHER PUBLICATIONS

Doblin, "Ongoing development of the TIRO process," CSIRO presentation, 28th Annual ITA Conference, Atlanta, Georgia, Oct. 7-10, 2012 (15 pages).
Wellwood, "Low Cost Titanium Powder Processes to Facilitate Near Net Shape Manufacture," CSIRO presentation, 22nd Annual ITA Conference, San Diego, California, Oct. 1-3, 2006 (21 pages).
International Search Report and Written Opinion for Application No. PCT/AU2016/050746 dated Nov. 7, 2016 (10 pages).
Traut, et al, "Coreduction of TiCl4, AlCl3, and VCl4 to Produce Titanium Alloy Sponge", Bureau of Mines Report of Investigations, 1987, RI 9133 (22 pages).
International Search Report and Written Opinion for Application No. PCT/AU2016/050745 dated Nov. 7, 2016 (10 pages).
International Search Report and Written Opinion for Application No. PCTAU2016/050747 dated Nov. 7, 2016 (9 pages).
Evdokimov et al., "Magnesium Reduction of Titanium Tetrachloride," Inorganic Materials, 2002, 38:5; 490-493.
Supplementary European Search Report for related Application No. EP16836271 dated May 7, 2018 (2 pages).
Supplementary European Search Report for related Application No. EP16836273 dated Jul. 27, 2018 (2 pages).
Doblin, et al., "Titanium powder from the TiRO™ process", Key Engineering Materials, vol. 520., pp. 95-11, available online Aug. 24, 2012.
Joshi et al., "Development of Ti—6Al—4V and Ti—1Al—8V—5Fe Alloys Using Low-Cost TiH2 Powder Feedstock", Journal of Materials Engineering and Performance, vol. 22, No. 4, Sep. 2012, pp. 995-1003.
Gong et al., "Melt Pool Characterization for Selective Laser Melting of Ti—6Al—4V Pre-alloyed Powder", Conference: 25th Annual International Solid Freeform Fabrication Symposium, 2014, pp. 256-267.
Guo Kui ed., "Introduction to Metallurgical Technology", Central South University Press, Aug. 31, 1991, pp. 340-350.
Chinese Patent Office Search Report for Application No. 201680058440X dated Aug. 20, 2019 (4 pages including statement of relevance).
Chinese Patent Office Search Report for Application No. 201600584772 dated Aug. 22, 2019 (4 pages including statement of relevance).
Japanese Patent Office Notice of Reasons for Refusal for Application No. 50959012018 dated Jun. 2, 2020 (23 pages including English translation).
Japanese Patent Office Notice of Reasons for Refusal for Application No. 50959512018 dated Jun. 2, 2020 (19 pages including English translation).

\* cited by examiner

METHOD FOR PRODUCTION OF A COMPOSITE MATERIAL USING EXCESS OXIDANT

CROSS-REFERENCE TO RELATED APPLICATIONS

This application is divisional application of U.S. application Ser. No. 15/637,256, filed Jun. 29, 2017, which is a continuation of International Application No. PCT/AU2016/050746, filed Aug. 12, 2016, which claims priority to Australian Application No. 2015903277, filed Aug. 14, 2015, all of which are incorporated herein by reference in their entirety.

FIELD OF INVENTION

The present invention relates to a method for the production of a composite material via reduction-oxidation reaction with excess oxidant. In particular, the invention relates to a method for composite material production in which at least one metal compound oxidant is fed to a reactor in excess and reacted with at least one reductant to produce the desired composite material from the at least one metal compound. The invention further provides methods for metal recovery from the composite material. The invention still further provides composite material formed by the method and metal subsequently recovered.

BACKGROUND ART

International Publication No. WO 2006/042360 provides a method for producing titanium by reaction of titanium tetrachloride with magnesium in a reactor, which may comprise a fluidised bed. The temperature in the reactor is above the melting point of magnesium, but below the melting point of magnesium chloride. The method produces particles comprising titanium which are removed from the reactor and processed in order to recover titanium particles generally having a particle size of greater than 500 µm. Compliant with conventional thinking, the method of WO 2006/042360 is operated under an excess of magnesium with unreacted magnesium optionally collected and recycled to the reactor. This is understood to achieve complete conversion of $TiCl_4$ to titanium metal, while avoiding the formation of sub-chlorides, $TiCl_2$ and $TiCl_3$.

The present invention provides methods for producing a composite material from at least one metal compound in which an excess of oxidant is fed to the reactor during processing. The composite material will generally be in finely divided form and the method, generally, does not place significant weight on the exclusion of by-products in the composite material. Metal recovered from the composite material may likewise be in a finely divided form.

The subject matter claimed herein is not limited to embodiments that solve any disadvantages or that operate only in environments such as those described above. Rather, this background is only provided to illustrate one exemplary technology area where some embodiments described herein may be practice.

SUMMARY OF INVENTION

As mentioned above, the present invention relates to a method for composite material production with excess oxidant being fed to the reactor during processing. More particularly, a method in which at least one metal compound oxidant is fed to the reactor such that it is in excess and is reacted with at least one reductant to produce the desired composite material from the at least one metal compound is provided.

For convenience, the term "composite material" will be used to describe a composite material that is a metal-salt composite, an alloy-salt composite or an inter-metallic-salt composite. That is, the term "composite material" as used herein is intended to include within its scope a composite comprising a salt and (i) one metallic element, (ii) two or more metallic elements, or (iii) one or more metallic elements together with one or more non-metallic elements. As used herein, reference to an "oxidant" includes within its scope metal compounds ($M_PC$) that can be reduced by a reductant (R). Reference to a "reductant" includes within its scope a reductant (R) capable of reducing the metal compound ($M_PC$). Reference to "in excess relative to the reductant (R)" includes within its scope excess of the metal compound ($M_PC$) relative to reductant that is expected to be available to be reduced in the prevailing conditions. For example, large particles of reductant may not be entirely available to be reduced in the prevailing conditions.

According to one aspect of the invention there is provided a method of producing a composite material comprising:
supplying a metal compound ($M_PC$) of a product metal ($M_P$) and a reductant (R) capable of reducing the metal compound ($M_PC$) of the product metal ($M_P$) to a reactor;
forming a composite material comprising a matrix of oxidised reductant ($R_O$) of the reductant (R), the product metal ($M_P$) dispersed in the matrix of oxidised reductant ($R_O$), and at least one of (i) one or more metal compounds ($M_PC_R$) of the metal compound ($M_PC$) in one or more oxidation states and (ii) the reductant (R); and
recovering the composite material from the reactor,
wherein the metal compound ($M_PC$) of the product metal ($M_P$) is fed to the reactor such that it is in excess relative to the reductant (R).

The method of the invention therefore provides for the recovery of composite material comprising the product metal ($M_P$) dispersed in a matrix of oxidised reductant ($R_O$) of the reductant (R), and at least one of (i) one or more, for example reduced, metal compounds ($M_PC_R$) of the metal compound ($M_PC$) and (ii) the reductant (R). Where a reduced metal compound ($M_PC_R$) of the metal compound ($M_PC$) is present in the composite, this includes compounds of the product metal ($M_P$) in various oxidation states, such as sub-halides of the metal compound ($M_PC$) of a product metal ($M_P$).

In preferred embodiments, the temperature within the reactor is such that the composite material maintains a finely divided particulate form, the temperature preferably being below the melting point of the oxidised reductant ($R_O$) of the reductant (R), and further optionally above the melting point of the reductant (R). This embodiment will be discussed in more detail below.

As used herein, the terms "temperature in the reactor" are intended to mean the average or bulk temperature of the reactor. There may be localised "hot spots" within the reactor due to localisation of exothermic reactions within the reactor. However, the temperatures observed at such "hot spots" should not be taken as being representative of the reactor temperature.

For the avoidance of doubt, as used herein the terms "fed to the reactor such that it is in excess relative to the reductant (R)" is intended to include situations where the amount of metal compound ($M_PC$) of the product metal ($M_P$) fed to the reactor is in excess of stoichiometric equivalence relative to the amount of reductant (R) available for reaction in the reactor. Where more than one metal compound ($M_PC$) of the product metal ($M_P$) is fed to the reactor, the terms are intended to include situations where the total amount of the metal compounds ($M_PC$) of the product metals ($M_P$) is in excess of stoichiometric equivalence relative to the amount of reductant (R) available for reaction in the reactor. Where more than one reductant (R) is fed to the reactor, the terms are intended to include situations where the amount of metal compound ($M_PC$) of the product metal ($M_P$) fed to the reactor is in excess of stoichiometric equivalence relative to the amount of the most electropositive of the reductants (R) available for reaction in the reactor. Where more than one metal compound ($M_PC$) of the product metal ($M_P$) is fed to the reactor and more than one reductant (R) is fed to the reactor, the terms are intended to include situations where the total amount of the metal compounds ($M_PC$) of the product metals ($M_P$) is in excess of stoichiometric equivalence relative to the amount of the most electrochemically positive of the reductants (R) available for reaction in the reactor.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

The metal compound ($M_PC$) of the product metal ($M_P$) (i.e. the oxidant) is fed to the reactor such that it is in excess relative to the reductant (R). This is contrary to previous teachings in the art, which generally require addition of an excess of reductant. As discussed above, an excess of reductant has conventionally been considered advantageous in order to ensure complete reduction of the metal compound ($M_PC$) to product metal ($M_P$), and also to eliminate the inclusion of reduced metal compounds ($M_PC_R$) of the metal compound ($M_PC$) in the product. According to the present invention, however, it has been found that advantages may be provided by ensuring an excess of metal compound ($M_PC$) of the product metal ($M_P$) (i.e. oxidant) is fed to the reactor. These advantages will be elucidated in more detail below.

The metal compound ($M_PC$) of the product metal ($M_P$) may be fed to the reactor at any amount in excess of stoichiometric equivalence relative to the reductant (R) available for reaction in the reactor. In a preferred embodiment the molar ratio of metal compound ($M_PC$) of the product metal ($M_P$) to reductant (R) available for reaction in the reactor is 30:1, 15:1, 10:1, 5:1, 3:1, 2:1, 1.1:1, or 1.05:1.

In certain embodiments, it may be advantageous to recirculate excess metal compound ($M_PC$) of the product metal ($M_P$) back to the reactor. In that case, it will be appreciated that the recirculated metal compound ($M_PC$) may be taken into account when considering the stoichiometric excess of the metal compound ($M_PC$) fed to the reactor. Specifically, it is envisaged that on recirculating of the metal compound ($M_PC$) back to the reactor, the amount of new metal compound ($M_PC$) required for introduction to the reactor may be towards, or stoichiometrically equivalent to the amount of reductant (R) being fed to the reactor.

Generally, where the metal compound ($M_PC$) of the product metal ($M_P$) is volatile in the reactor, the residence time of the reductant (R) in the reactor will be substantially more than that of the metal compound ($M_PC$) of the product metal ($M_P$). In this embodiment, the reductant (R) may have a residence time in the reactor that is from 100-10,000 times the residence time of the metal compound ($M_PC$) of the product metal ($M_P$). In embodiments where the metal compound ($M_PC$) of the product metal ($M_P$) is a solid or liquid, the residence time of the reductant (R) in the reactor may be substantially the same as that of the metal compound ($M_PC$) of the product metal ($M_P$).

The metal compound ($M_PC$) of the product metal ($M_P$) may be introduced to the reactor in solid, liquid or vapour form. For example, it may be appropriate to feed a solid in situations where the metal compound ($M_PC$) of the product metal ($M_P$) is a solid under the prevailing conditions in the reactor, such as where the metal compound ($M_PC$) of the product metal ($M_P$) comprises a chromium compound, such as chromium chloride, or the like. However, the metal compound ($M_PC$) of the product metal ($M_P$) is preferably in vapour or liquid form when fed to the reactor. In preferred embodiments the metal compound ($M_PC$) of the product metal ($M_P$) is fed to the reactor at ambient conditions, allowing heat exchange between the reactor and the metal compound ($M_PC$) of the product metal ($M_P$).

Generally, the reductant (R) is fed to the reactor as a solid, solid particulate or molten liquid. The feed rate of the reductant (R) to the reactor will be somewhat dependent on the scale of the operation. The feed rate of the metal compound ($M_PC$) of the product metal ($M_P$) may also depend on the scale of the operation.

As noted above, the method of the invention is considered suitable for the production of composites comprising a single metallic element, two or more metallic elements, and one or more metallic elements together with one or more non-metallic elements. For example, the composites may comprise an alloy or an inter-metallic as described above. In that regard, the metal compound ($M_PC$) of the product metal ($M_P$) may comprise a pnictogen compound or chalcogen compound. In preferred embodiments, the metal compound ($M_PC$) of the product metal ($M_P$) is a metal halide. Preferably, the metal halide is selected from the group consisting of halides of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof.

According to a particularly preferred embodiment of the invention, the metal compound ($M_PC$) of the product metal ($M_P$) comprises $TiCl_4$. In this embodiment, the $TiCl_4$ is preferably in liquid form when fed to the reactor, although it may also be in vapour form.

The selection of the reductant (R) is not particularly limited. In preferred embodiments, the reductant (R) comprises a metal reductant ($M_R$) selected from the group consisting of Mg, Na, K, Li, Ba, Ca, Be, Al and any combination thereof, and any one or more thereof with another reductant (R'), although it is envisaged other options may also be suitable. In embodiments where two or more reductants (R), which may include one or more metal reductant ($M_R$), are fed to the reactor, the amount of metal compound ($M_PC$) of the product metal ($M_P$) fed to the reactor is in excess of stoichiometric equivalence relative to the amount of the most electrochemically positive of the reductants (R) available for reaction in the reactor. In other embodiments, it is thought that the reductant (R) may suitably comprise a multi-component reductant, such as an alloy, for example an Mg—Al or Mg—Pd intermetallic or alloy, where some or all of the components participate in reduction-oxidation reactions in the process.

The temperature within the reactor is preferably such that the composite material maintains a finely divided particulate form. For example, the temperature is preferably below the melting point of the oxidised reductant ($R_O$) of the reductant (R). It may further be above the melting point of the reductant (R), although the method of the invention may work at lower temperatures. Advantageously, the reductant (R) is liquid in the reactor, while the oxidised reductant ($R_O$) is in solid form. In a preferred embodiment of the invention, the reductant (R) comprises magnesium and the temperature within the reactor is below about 714° C., for example from 650-714° C. It will be appreciated that the temperature within the reactor may be easily identified for other reductants (R), such as metal reductants, depending on the melting point of the oxidised reductant ($R_O$), and to a lesser extent the reductant (R), for a particular system.

The reactor may be any suitably configured apparatus in which the method may be carried out. For example, the reactor may be any type of gas-solid contact device. In a preferred embodiment, the reactor comprises a fluidised bed.

At least initially, the reactor may comprise seed particles or surfaces of the product metal ($M_P$), oxidised reductant ($R_O$) of the reductant (R), or other substrate material or a combination thereof. The reactor may alternatively or additionally comprise other seed particles or surfaces. For example, in some instances the seed particles or surfaces may comprise a composite material as described herein. In a preferred embodiment, where the reactor comprises a fluidised bed, the method may be self-seeding such that the method can be carried out continuously without the need to supply fresh seed particles or surfaces to the fluidised bed. The initial particle size of the seed particles of the fluidised bed is preferably from 10 μm to 2 mm, more preferably from 50 μm to 500 μm. In another embodiment, the fluidised bed may have seed particles or surfaces introduced continuously or periodically.

As noted above, the method of the invention may be used in the production of composite material comprising a single metallic element and a salt of a single reductant. It is envisaged that this embodiment represents the most simplistic form of the method of the invention.

In other embodiments, however, the method of the invention will relate to more complex systems, for example in the production of an alloy-salt composite or inter-metallic-salt composite, or composites that include one or more non-metallic components. In such systems, more than one component may act as a reductant and two or more metal compounds ($M_P C$) of two or more product metals ($M_P$) may be fed to the reactor, and/or a non-metallic component may be additionally fed to the reactor.

According to certain embodiments of the invention, the product metal ($M_P$) is an alloy comprising two or more metallic elements and the method comprises reacting metal compounds ($M_P C$) of each of the two or more metallic elements with the reductant (R) in the reactor to reduce the metal compounds ($M_P C$) of each of the two or more metallic elements and recovering the composite material comprising the alloy of the two or more metallic elements.

In this embodiment, it will be appreciated that the reactions within the reactor will be more complex and will be dependent on the electrochemical potential of the elements involved. In these embodiments, the total amount of the metal compounds ($M_P C$) is in excess relative to the reductant (R).

In these more complex systems, account must also be taken of the temperature within the reactor. Generally, the temperature within the reactor is relatively close to or above the melting point of the reductant or any individual component of the reductant (R) and below the melting point of the most volatile oxidised reductant ($R_O$) component of the reductant (R).

In a particularly preferred embodiment in which the product metal ($M_P$) is an alloy comprising two or more metallic elements, the two or more metallic elements are selected from the group consisting of titanium, aluminium and vanadium. According to this embodiment, the method may comprise reacting two or more metal halides ($M_P X$) selected from the group consisting halides of titanium, aluminium and vanadium with reductant (R) comprising magnesium, and recovering a metal-salt composite comprising an alloy of two or more metallic elements selected from the group consisting of titanium, aluminium and vanadium and a halide salt of magnesium. For example, the alloy may approximate Ti64 alloy.

In that regard, it will be appreciated that Ti64 alloy generally refers to an alloy having a chemical composition of 6% aluminium, 4% vanadium, 0.25% (maximum) iron, 0.2% (maximum) oxygen, and the remainder titanium. Ti64 is also commonly referred to as Grade 5 titanium.

In other embodiments, the method comprises supplying (i) at least one metal compound ($M_P C$) of at least one of metallic element and (ii) at least one other metallic or non-metallic component and the reductant (R) to the reactor and reducing the at least one metal compound ($M_P C$) of the at least one metallic element and recovering the composite material comprising the at least one metallic element of the at least one metal compound ($M_P C$) and the at least one other metallic or non-metallic component. For example, the additional component may comprise any one or more of the groups consisting of beryllium, boron, carbon, nitrogen, oxygen, aluminium, silicon, phosphorous, sulphur, scandium, vanadium, chromium, manganese, iron, cobalt, nickel, copper, zinc, gallium, germanium, arsenic, selenium, yttrium, zirconium, niobium, molybdenum, ruthenium, rhodium, palladium, silver, cadmium, indium, tin, antimony, tellurium, hafnium, tantalum, tungsten, rhenium, osmium, iridium, platinum, gold, lead, bismuth, the Rare Earths and compounds thereof.

In certain embodiments other components, which may comprise additional elements or compounds, may be included in the composite material by introducing such components into the reactor. The method may therefore additionally comprise feeding metallic or other desirable components for inclusion in the composite material that are not expected to participate in reactions in the reactor. Additional components may be selected from any element that is electrochemically more negative than any of the product metals ($M_P$). Where the product metal ($M_P$) is titanium, this may include by way of example an element selected from the group consisting of vanadium, chromium and nickel.

In one embodiment, palladium is incorporated into the composite material. In that regard, Grade 7 titanium contains 0.12 to 0.25% palladium. The small quantity of palladium provides enhanced crevice corrosion resistance at low temperatures and high pH. Palladium may be added to the composite material by, for example, introducing palladium directly or as a component of the reductant (R) to the reactor. In this case, the palladium does not actually alloy with the metal product ($M_P$), rather it is an inclusion and passes through if added as a metal.

In certain embodiments, the composite material comprises unreacted reductant (R), for example up to 20 wt % reductant (R). The composite may more generally comprise up to 3 wt % reductant (R), or may comprise a negligible amount of the reductant (R), or in more complex systems the least electropositive component of the reductant (R). This is achieved through the use of an excess of oxidant in the reactor, which effectively reacts with the majority, if not all, of the reductant (R) in the reactor. As such, reductant (R) may not be present in the metal composite product produced in the reactor. This also provides additional advantages when compared with conventional processes in which excess reductant is seen in the reactor. That is, excess reductant does not accumulate within the reactor, for example as pools or droplets of metal, or on the internal walls of the reactor. It has been found that in cases where the reductant has appeared in the composite material, again, excess reductant has not accumulated within the reactor.

Following from this, according to another aspect of the invention there is provided a composite material comprising:

a matrix of oxidised reductant ($R_O$);

a product metal ($M_P$) dispersed in the matrix of oxidised reductant ($R_O$); and at least one of (i) one or more metal compounds ($M_P C_R$) of the product metal ($M_P$) in one or more oxidation states, and (ii) a reductant (R).

As noted above, the composite material may comprise up to 20 wt %, more generally 3 wt % of the reductant (R).

As with the previously described aspect of the invention, the product metal ($M_P$) is preferably selected from the group consisting of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof. As such, in accordance with the definitions provided above, the metal component may be an alloy of two or more metals. In certain embodiments, the product metal ($M_P$) comprises at least two of titanium, aluminium and vanadium.

The oxidised reductant ($R_O$) preferably comprises a metal halide ($M_R X$), for example $MgCl_2$, NaCl, KCl, LiCl, $BaCl_2$, $CaCl_2$, $BeCl_2$, $AlCl_3$ or any combination thereof. In that regard, the reductant (R) may be selected from the group consisting of Mg, Na, K, Li, Ba, Ca, Be, Al and any combination thereof, and one or more thereof with another reductant (R').

Referring to the above description, the method of the invention is conducted under an excess feed of oxidant. As such, the one or more metal compounds ($M_P C_R$) of the product metal ($M_P$) in one or more oxidation states may comprise one or more metal halides ($M_P X$) of the metal component ($M_P$).

The composite material may be in the form of particles. The particles may be spherical, or any shape. They may be regular or irregular in shape. The particles may have an average particle size of up to 500 µm, preferably from 20-300 µm. It is envisaged that desired shapes and particle sizes of the particles may be advantageously generated by manipulating the method of the invention, described above. In that regard, we refer to the more detailed description of the invention that follows.

The metal component ($M_P$) within the composite material generally has a particle size of up to about 1 micron. The surface area to volume ratio of the metal component ($M_P$) in the protective matrix is preferably greater than 6 $m^2$/mL.

In that regard, taking as an example where the composite material is formed by contacting Mg with an excess of $TiCl_4$ in a fluidised bed reactor to form Ti metal dispersed in a $MgCl_2$ matrix, it is thought that at the extreme lower limit of particle size, one molecule of $TiCl_4$ may react with one atom of Mg and produce $MgCl_2$ and $TiCl_2$. Thereafter, one more atom of Mg reacts with $TiCl_2$ and forms a second $MgCl_2$ and a single Ti atom. Therefore, at its limit, it is envisaged that the finely divided metal component ($M_P$) may be present in the protective matrix of $MgCl_2$ on an atomic scale. Such examples would represent true "primary particles" of the metal component ($M_P$). In practice, there is the inherent desire on the part of the metal component ($M_P$) to nucleate or agglomerate (and possibly sinter), especially at nascent sites and in the presence of some local heating, mixing, possible electronic transfer through partially melted salt, etc. As such, it is considered that there may be many atoms coalescing together to form the more realistically viable "primary particles" that would be observed under analysis. These particles may be extremely small, for example on the nano-scale. At some point, however, further aggregation is not possible because, according to this embodiment at least, of "freezing" of the $MgCl_2$ to encapsulate the Ti in its current state of agglomeration, resulting in a frozen sea of $MgCl_2$ with homogeneously dispersed titanium particles. Accordingly, in this particular embodiment, an ultrahigh surface area metal with no oxide barrier layer is completely protected from forming larger particles or otherwise reacting unless the $MgCl_2$ is removed. However, when the protective matrix, in this case $MgCl_2$ is removed (for example by melting), the titanium particles are free to move around and further aggregate and form larger structures, such as shells of Ti. These may be considered "secondary particles". It will be appreciated that these comments are equally relevant to the extreme upper limit of the surface area to volume ratio of the metal component ($M_P$) in the protective matrix.

Another advantageous characteristic of the metal component ($M_P$) of these preferred embodiments of the invention is the lack of a protective oxide layer. The metal component ($M_P$) particles of these embodiments do not have an activation barrier, which correlates with a lower activation energy (increase in reactivity) of the metal component ($M_P$). In addition to the above advantage, generally small particles are highly pyrophoric. The composite material of the preferred embodiments of the invention is, comparatively, not. For conventional metal powders of approximately <10 µm, pyrophoricity becomes a major issue, but can be serious even at much larger sizes (>100 µm) under some conditions. The protective matrix of the composite material of the invention advantageously overcomes this issue.

According to a further aspect of the invention there is provided a method of producing a product metal ($M_P$) comprising:

supplying a metal compound ($M_P C$) of a product metal ($M_P$) and a reductant (R) capable of reducing the metal compound ($M_P C$) of the product metal ($M_P$) to a reactor, wherein the metal compound ($M_P C$) of the product metal ($M_P$) is fed to the reactor such that it is in excess relative to the reductant (R);

forming a composite material comprising a matrix of oxidised reductant ($R_O$) of the reductant (R), the product metal ($M_P$) dispersed in the matrix of oxidised reductant ($R_O$), and at least one of (i) one or more metal compounds ($M_PC_R$) of the metal compound ($M_PC$) in one or more oxidation states and (ii) the reductant (R);

recovering the composite material from the reactor; and removing the oxidised reductant ($R_O$) of the reductant (R), and the reduced metal compound ($M_PC_R$) of the metal compound ($M_PC$) and the reductant (R), if present, from the composite material to recover the product metal ($M_P$).

The oxidised reductant ($R_O$) of the reductant (R) and reduced metal compound ($M_PC_R$) of the metal compound ($M_PC$) and reductant (R), if present, may be removed from the composite material by any suitable means. For example, the oxidised reductant ($R_O$) of the reductant (R) and reduced metal compound ($M_PC_R$) of the metal compound ($M_PC$) may be removed from the composite material by solvent leaching. Preferably, the oxidised reductant ($R_O$) of the reductant (R) and reduced metal compound ($M_PC_R$) of the metal compound ($M_PC$) are removed from the composite material by vacuum distillation.

In preferred embodiments, the method further comprises recovering the reductant (R). This may be achieved by any suitable means.

As discussed above, the temperature within the reactor is preferably above the melting point of the reductant (R) and below the melting point of the oxidised reductant ($R_O$) of the reductant (R).

In certain embodiments, as discussed above, where the metal compound ($M_PC$) is a metal halide, the reduced metal compound ($M_PC_R$) of the metal compound ($M_PC$) may comprise one or more sub-halides of the metal compound ($M_PC$).

Various features and embodiments of this aspect of the invention may be gleaned from the above description, which is incorporated herein in its entirety. In that regard, the product metal ($M_P$) may comprise titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof. Particular alloys of interest are those comprising at least two metallic elements selected from the group consisting of titanium, aluminium and vanadium. For example, the alloy may approximate a Ti64 alloy.

According to yet another aspect of the invention there is provided product metal ($M_P$) produced by the above described method of producing a product metal ($M_P$) according to the invention.

The product metal ($M_P$) may comprise particulate metal having a particle size of less than 500 µm. Preferably the product metal ($M_P$) comprises particulate metal having a particle size of up to 250 µm. It is believed that the particulate metal may be suitable for use in many powder metallurgical processes. In that regard, as mentioned above, it is envisaged that desired shapes and particle sizes of the particles may be advantageously generated by manipulating the method of the invention. That is, the size and shape of the particles may be manipulated in order to achieve suitable particles for a particular powder metallurgical process.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It should be appreciated that these drawings depict only typical embodiments of the invention and are therefore not to be considered limiting on its scope. The invention will be described and explained with additional specificity and detail through the accompanying drawings in which.

DETAILED DESCRIPTION OF THE PREFERRED EMBODIMENTS

Hereinafter, this specification will describe the present invention according to the preferred embodiments. It is to be understood that limiting the description to the preferred embodiments of the invention is merely to facilitate discussion of the present invention and it is envisioned without departing from the scope of the appended claims.

Figure 1:
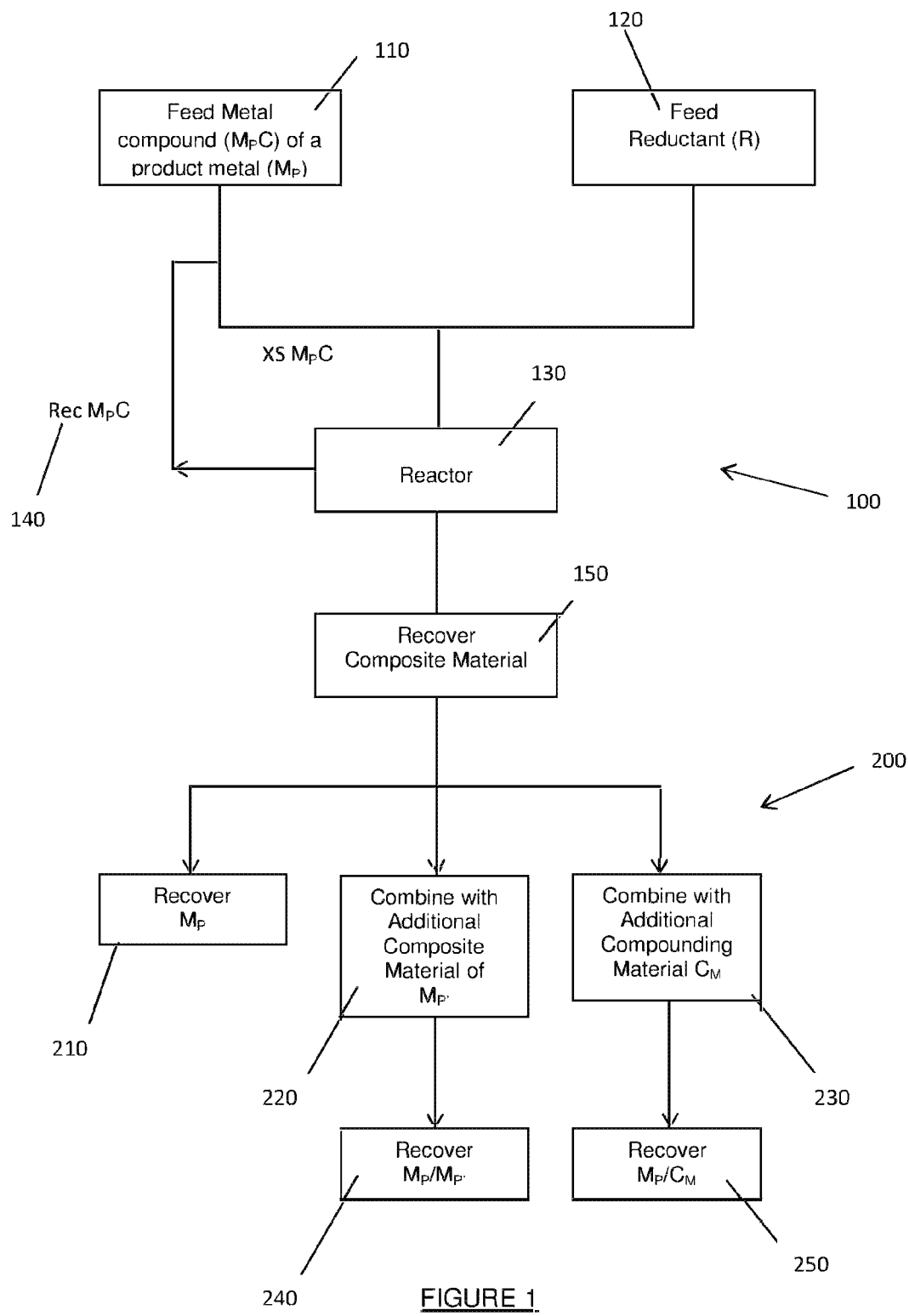
FIG. 1 illustrates a flow chart of a method for the production of composite material, including additional illustration of options for the treatment of the recovered composite material.

Referring to FIG. 1, a flow chart of a method 100 for the recovery of a composite material is illustrated. The flow chart also includes processing options 200 for the recovered composite material.

According to the method 100 for the recovery of a composite material, metal compound ($M_PC$) 110 of a product metal ($M_P$) and a reductant (R) 120 capable of reducing the metal compound ($M_PC$) 110 of the product metal ($M_P$) are supplied to a reactor 130. The amount of metal compound ($M_PC$) 110 supplied to the reactor 130, including any recycled metal compound ($M_PC$) 140, is in excess relative to the amount of reductant 120 available for reaction in the reactor 130. Composite material 150 is recovered from the reactor 130. The composite material comprises a matrix of an oxidised reductant ($R_O$) of the reductant (R), the product metal ($M_P$) dispersed in the matrix, and at least one of (i) a reduced metal compound ($M_PC_R$) of the metal compound ($M_PC$) and (ii) the reductant (R).

The reactor 130, which will be discussed in terms of a fluidised bed reactor with reference to FIG. 1, is run at a temperature that maintains the finely divided form of the composite material. The temperature is below the melting point of the oxidised reductant ($R_O$) of the reductant (R) 120, which forms part of the composite material 150. Generally, the temperature may also be close to or above the melting point of the reductant (R) 120. Where the temperature in the reactor 130 is between the melting point of the reductant (R) 120 and the melting point of the oxidised reductant ($R_O$), for example its oxidised salt, the reaction of the reductant (R) 120 with oxidant results in the formation of a composite material 150 comprised of largely or entirely solid character. This 'freezing' reaction advantageously has the impact of creating finely divided and highly pure reaction products. Without seeking to be bound by theory, it is thought that the particle size of the composite material 150 is such that the finely divided elements comprised within are sufficiently small that they interact differently with visible light than their bulk counterparts. For example, they may appear black or dark in colour. The finely divided structure of the composite material 150 product has advantages compared to composites of analogous nominal compositions that do not have the same finely divided structure. These advantages will be elucidated in more detail below.

Where the reductant (R) 120 is fed into the reactor 130 as a solid or solid particulate, the prevailing conditions in the reactor 130 ensure, with sufficient time, the melting of the reductant 120. The time required for melting of solid reductant 120 depends upon numerous factors, including the feed mechanism, whether the reductant 120 is fed with other materials, the temperature of the reactor 130, the reaction intensity of the reactor 130 per unit volume, the particulate density of the reductant 120 feed at any single location and, if other reductant or reagent or inert streams are in or are entering into the reactor, the proximity to these components and their respective temperatures when impinging on particles of the reductant 120.

The interaction of the reductant (R) 120 upon contacting other surfaces in the reactor 130 will depend on its phase at that time. If the reductant 120 particle is solid, it is possible the reductant 120 particle will collide and rebound. It will then continue to interact with other surfaces and environments in the reactor 130.

If the reductant 120 particle has a molten external surface and solid inner surface, it is possible the particle will adhere to any surface it impacts, creating a composite of the two objects. The particle will then continue to interact with other surfaces and environments in the reactor 130.

If the reductant 120 particle is molten when it interacts with other surfaces, it may wet the surface. Depending upon the nature of the solid-liquid interaction the thickness of the layer formed will vary. It is considered that this may be manipulated through varying intensity of interactions, density of reductant 120 feed, temperature and time, etc.

Whether the end location of molten reductant in the reactor 130 is as a stand-alone mass, wetted on a surface or combined with other surfaces, at some point it will generally interact with oxidant and react. At this point the thickness or the wetted layer or size of the molten mass or particle is considered of some importance in determining the extent of reaction of the reductant (R) 120 and the morphology of the final composite material 150.

If the particle or wetted layer is sufficiently large or not completely molten at this time, the freezing nature of the reaction as described previously can result in a proportion of the reductant (R) becoming encapsulated by the composite material 150. Where the surface exposed to oxidant reacts to form a solid it may form a barrier (i.e. shell) that may restrict or eliminate the participation of the remaining reductant in further reduction. If the particle is sufficiently small or the wetted layer sufficiently thin, for example if the thickness of the reaction layer is equivalent to the radius of the particle or the thickness of the wetted layer, the process can consume the majority if not all of the reductant (R).

The amount of oxidant in the reactor relative to reductant (R) will be an important factor in determining the probability of the above mentioned interactions. Weighting of one form of interaction over others can be manipulated by changing operating conditions, feed forms, etc. The nature of surfaces in the reactor available for interaction, potential for sequential ordering and forms in which the reductant and oxidant are brought into contact can result in composites being formed which have diverse characteristics. These may include, without limitation, excess or fully consumed reductant, layers of composite, layers of composite with magnesium interstitial layers. It is thought that novel structured materials may be formed by sequential layering of dissimilar layers of prescribed composition.

Once the composite material is recovered 150, it may be stored under suitable conditions for later use, or may be processed 200 in various ways. The processing may include, without limitation, recovery of the product metal ($M_P$) 210, combining the composite material with composite material of other product metal ($M_P$) 220, and/or other compounding material ($C_M$) 230. As such, it is envisaged that various products may be recovered, including without limitation product metal ($M_P$), an alloy or mixture of product metals ($M_P/M_{P'}$) 240, and a mixture or composite product ($M_P/C_M$) 250. In any of these recovery processes, it may also be desirable to recover reductant (R) and optionally return this to the reductant feed 120.

The recovery of product from the composite materials of the present invention is described in detail in a co-pending International patent application with the title "METHOD FOR RECOVERY OF METAL-CONTAINING MATERIAL FROM A COMPOSITE MATERIAL", filed on the same date as the present application. The content of the co-pending application is incorporated herein in their entirety.

EXAMPLES

The following examples are provided for exemplification only and should not be construed as limiting on the invention in any way.

Example 1

Production of Titanium Metal Composite in the Presence of Excess Oxidant with Unreacted Reductant Present in the Composite A reaction vessel made from stainless steel was purged with high purity argon and heated externally to 680° C. The system was charged with 20 kilograms of titanium composite particles as a seed material. The system was allowed to reach an internal temperature of 655° C. At this point reactant feeds were introduced.

Titanium tetrachloride was supplied at a rate of 8 kilograms per hour. In this example the reductant phase was magnesium metal, supplied at a rate of 2 kilograms per hour as a finely divided powder conveyed in a low volume of argon gas carrier stream entering the reactor. In these proportions titanium tetrachloride is in excess by approximately 2.5 wt % relative to magnesium as the most electrochemically positive component that could be oxidised in the reactor.

The addition of the reactants to the reactor increased the temperature in the reactor consistent with the exothermic nature of the reactions, reaching a steady bed temperature of 680° C. for an extended period.

The product stream from the reactor included free flowing black spheres (<3 mm diameter). Titanium tetrachloride was observed in the exhaust gas stream of the reactor.

The initial chemical composition of the bed is shown in the first line Table 1 below. Samples from the product stream were taken hourly with compositions of these shown in subsequent lines of Table 1.

The composition of the product is shown to be consistent and to contain a relatively constant composition of titanium and magnesium as determined by XRF over a period of time. The composition of these particles indicates that they contain additional magnesium and less titanium than would be expected for stoichiometric reaction of titanium tetrachloride and magnesium (20.4% Mg and 20.1% Ti) despite the presence of excess oxidant. This indicates that the composite particles contain at least some magnesium metal that was not oxidised.

Figure 2:
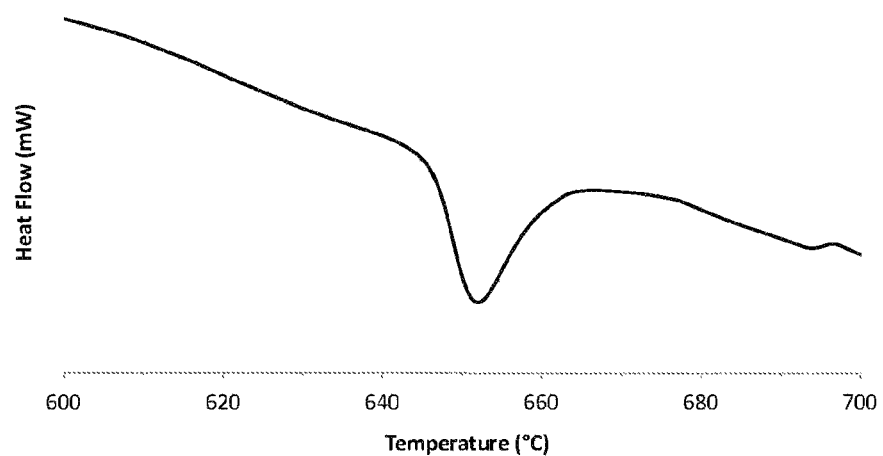
FIG. 2 shows a thermogram of the sample of Example 1 over the relevant temperature range for the solid to liquid transition of magnesium.

FIG. 2 shows a thermogram of the sample over the relevant temperature range for the solid to liquid transition of magnesium. The endotherm centred at 650° C. confirms the presence of a quantity of unreacted magnesium metal.

Heating of the composite particles from this run under prevailing conditions to remove the excess magnesium and magnesium chloride salt left titanium metal particles.

TABLE 1

Titanium with constant excess Mg in composite

| Ti (total) (wt %) | Mg (wt %) | Mg in excess (%) |
|---|---|---|
| 19.44 | 20.7 | 4.9 |
| 19.52 | 20.8 | 4.9 |
| 19.6 | 21.1 | 6.0 |
| 19.59 | 21.3 | 7.1 |
| 19.51 | 21.1 | 6.5 |
| 19.58 | 21 | 5.6 |
| 19.46 | 20.8 | 5.3 |
| 19.76 | 21 | 4.7 |
| 19.55 | 21 | 5.8 |
| 19.49 | 20.8 | 5.1 |
| 19.56 | 20.8 | 4.7 |
| 19.55 | 20.6 | 3.8 |
| 19.62 | 20.8 | 4.4 |
| 19.58 | 21.1 | 6.1 |
| 19.57 | 21.3 | 7.2 |
| 19.6 | 21.4 | 7.5 |
| 19.36 | 20.9 | 6.3 |
| 19.55 | 20.8 | 4.8 |

NOTE:
Mg in excess = (wt % Mg/wt % Ti)/(2 * MW(Mg)/MW(Ti)) * 100 − 100 where the wt % of Ti and Mg is in all forms, metallic or oxidised as measured using a technique such as XRF.

Example 2

Production of Titanium Composite in the Presence of Excess Oxidant Demonstrating the Minimisation of Unreacted Reductant Present in the Composite A reaction vessel made from stainless steel was purged with high purity argon and heated externally to 680° C. The system was charged with 20 kilograms of titanium composite particles as a seed material. The system was allowed to reach an internal temperature of 655° C. At this point reactant feeds were introduced.

Titanium tetrachloride was supplied at a rate of 6.3 kilograms per hour. In this example the reductant phase was magnesium metal, supplied at a rate of 1.5 kilograms per hour as a finely divided powder conveyed in a low volume of argon gas carrier stream entering the reactor. In these proportions titanium tetrachloride is in excess by 7.5 wt % relative to magnesium that could be oxidised in the reactor.

The addition of the reactants to the reactor increased the temperature in the reactor consistent with the exothermic nature of the reactions, reaching a steady bed temperature of 680° C. for an extended period.

The product stream from the reactor included free flowing black spheres (<3 mm diameter). Titanium tetrachloride was observed in the exhaust gas stream of the reactor.

The initial chemical composition of the bed is shown in the first line of Table 2. Samples from the product stream were taken hourly with compositions of these shown in subsequent lines of Table 2.

The impact of a more significant excess of titanium tetrachloride fed into the reactor than in example 1 is observed in the reduction of unreacted magnesium being present in the composite particle samples over time. The final composition of these particles indicates that they contain very little to no additional magnesium than would be expected for stoichiometric reaction of titanium tetrachloride and magnesium despite the presence of excess oxidant.

Figure 3:
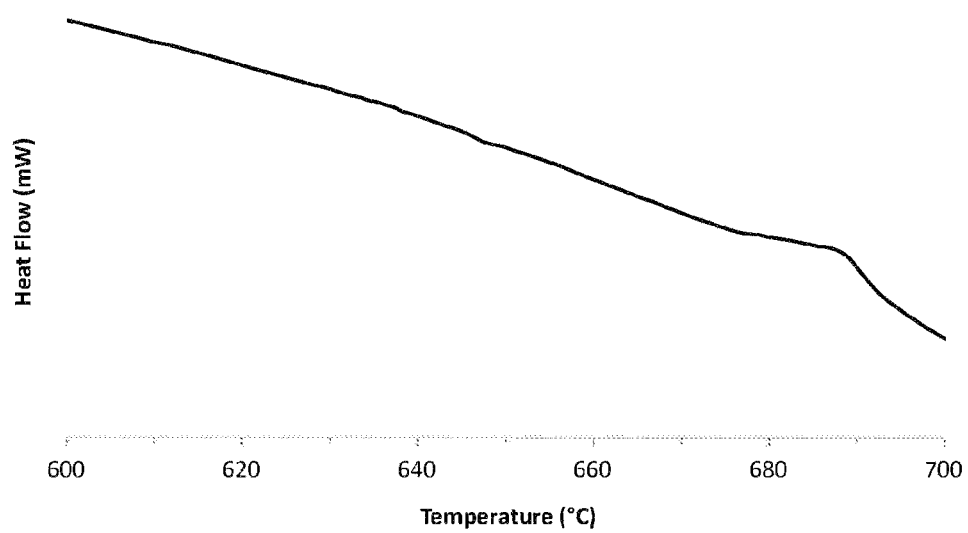
FIG. 3 shows a thermogram of the sample of Example 2 over the relevant temperature range for the solid to liquid transition of magnesium.

FIG. 3 shows a thermogram of the sample over the relevant temperature range for the solid to liquid transition of magnesium. The absence of an endotherm centred around 650° C. confirms that no substantive unreacted magnesium metal is present in the sample.

Heating of the composite particles from this run under prevailing conditions to remove the magnesium chloride and the little, if any, excess magnesium left titanium metal particles.

TABLE 2

Titanium with reducing excess Mg in composite to low level

| Ti (total) (wt %) | Mg (wt %) | Mg in excess (wt %) |
|---|---|---|
| 19.80 | 20.63 | 2.6 |
| 19.75 | 20.57 | 2.6 |
| 19.73 | 20.42 | 2.0 |
| 19.72 | 20.29 | 1.3 |
| 19.86 | 20.26 | 0.4 |
| 19.92 | 20.31 | 0.4 |
| 19.86 | 20.27 | 0.5 |
| 19.71 | 20.19 | 0.9 |
| 19.84 | 20.24 | 0.4 |

Example 3

Production of Titanium Composite in the Presence of Excess Oxidant Demonstrating the Formation of Larger Amounts of Sub-halides A reaction vessel made from stainless steel was purged with high purity argon and heated externally to 680° C. The system was charged with 20 kilograms of titanium composite particles as a seed material. The system was allowed to reach an internal temperature of 655° C. At this point reactant feeds were introduced.

Titanium tetrachloride was supplied at a rate of 7.3 kilograms per hour. In this example the reductant phase was magnesium metal, supplied at a rate of 1.5 kilograms per hour as a finely divided powder conveyed in a low volume of argon gas carrier stream entering the reactor. In these proportions titanium tetrachloride is in excess by approximately 25 wt % relative to magnesium fed into the reactor.

The addition of the reactants to the reactor increased the temperature in the reactor consistent with the exothermic nature of the reactions, reaching a steady bed temperature of 680° C. for an extended period.

The product stream from the reactor included free flowing black spheres (<3 mm diameter). Titanium tetrachloride was observed in the exhaust gas stream of the reactor.

The initial chemical composition of the bed is shown in the first line of Table 3. Samples from the product stream were taken hourly with compositions of these shown in subsequent lines of Table 3.

The impact of a more significant excess of titanium tetrachloride fed into the reactor than in example 2 is observed in the reduction of magnesium being present in the composite particle samples over time. The final composition of these particles indicates that they contain less magnesium and more titanium than would be expected for the stoichiometric reaction of titanium tetrachloride and magnesium. The total quantity of magnesium and titanium is also greater than would be expected for the stoichiometric reaction of titanium tetrachloride and magnesium, implying a reduction in total chlorine content of the composite. These factors all point to the composite containing increased levels of partially reduced titanium chlorides with little to no metallic magnesium.

Heating of the composite particles from this run under prevailing conditions to remove the excess magnesium chloride and partially reduced titanium chlorides leaves behind titanium metal particles.

TABLE 3

Titanium with reducing excess Mg in composite until formation of sub-halides

| Ti (total) (wt %) | Mg (wt %) | Mg in excess (wt %) |
|---|---|---|
| 20.21 | 21.0015 | 2.3 |
| 20.04 | 22.159 | 8.9 |
| 20.2 | 21.2115 | 3.4 |
| 20.455 | 21.0395 | 1.3 |
| 20.375 | 20.6395 | −0.3 |
| 20.425 | 20.479 | −1.3 |
| 20.41 | 20.341 | −1.9 |
| 21.335 | 21.066 | −2.8 |
| 20.695 | 20.367 | −3.1 |
| 20.24 | 20.1885 | −1.8 |
| 20.615 | 20.258 | −3.2 |
| 20.46 | 20.1065 | −3.2 |
| 20.605 | 20.058 | −4.1 |

Example 4

Titanium-Aluminium-Vanadium Composite

A reaction vessel made from stainless steel was purged with high purity argon and heated externally to 680° C. The system was charged with 200 grams of titanium composite particles as a seed material. The system was allowed to reach an internal temperature of 655° C. At this point reactant feeds were introduced.

Titanium tetrachloride was supplied at a rate of 424 grams per hour, vanadium tetrachloride was supplied at a rate of 18 grams per hour and aluminium chloride was supplied at a rate of 36 grams per hour. In this example the reductant phase was magnesium metal, supplied at a rate of 113 grams per hour as a finely divided powder conveyed in a low volume of argon gas carrier stream entering the reactor. In these proportions $TiCl_4$, $VCl_4$ and $AlCl_3$ are in excess by a total of 47% relative to the amount of magnesium that could be oxidised in the reactor.

The addition of the reactants to the reactor increased the temperature in the reactor consistent with the exothermic nature of the reactions, reaching a steady bed temperature of 680° C. for an extended period.

The product stream, from the reactor included free flowing black spheres (<3 mm diameter). Metal halides were observed in the exhaust gas stream of the reactor.

A sample from the product stream was taken and subjected to heating under prevailing conditions to remove metal halides and any excess magnesium leaving behind titanium-aluminium-vanadium containing particles. This is shown in Table 4.

TABLE 4

Composition of metal component retained after removal of volatiles from Titanium - Aluminium - Vanadium composite.

| Sum (%) | Ti % | Mg % | Al % | V % | As Ppm | Bi ppm | Co ppm | Cr ppm | Fe ppm | Mn ppm |
|---|---|---|---|---|---|---|---|---|---|---|
|  |  | <0.002 | <0.002 | <0.002 | <20 | <20 | <20 | <20 | <20 | <20 |
| 99.0 | 91.1 | 0.11 | 2.24 | 4.93 | <20 | <20 | 55 | 790 | 3826 | 368 |
| 99.0 | 91.2 | 0.10 | 2.22 | 4.87 | <20 | <20 | 28 | 759 | 3744 | 376 |

| Mo Ppm | Na ppm | Nb ppm | Ni ppm | Pb Ppm | Si ppm | Y ppm | Zr ppm | W Ppm | Sn Ppm |
|---|---|---|---|---|---|---|---|---|---|
| <20 | <20 | <20 | <20 | <20 | <20 | <20 | <20 | <50 | <20 |
| 119 | 113 | <20 | 779 | <20 | <20 | <20 | 31 | <20 | n/a |
| 117 | 81 | <20 | 738 | <20 | 54 | <20 | 23 | <20 | n/a |

The ratios of metal compounds fed into the reactor were approximately 90% Ti, 6% Al and 4% V on a metal mass basis. Despite this, the final metal composition of Ti 91%, Al 2.24% and V 4.93% indicates that each different halide has a differing conversion in the reactor. As such, to be able to achieve a specific desired composition it is essential to feed at least one oxidant in excess to drive the reduction-oxidation reactions to the desired degrees.

Example 5

Production of Vanadium Composite

A reaction vessel made from stainless steel was purged with high purity argon and heated externally to 680° C. The system was charged with 200 grams of titanium composite particles as a seed material. The system was allowed to reach an internal temperature of 655° C. At this point reactant feeds were introduced.

Vanadium tetrachloride was supplied at a rate of 454 grams per. In this example the reductant phase was magnesium metal, supplied at a rate of 95 grams per hour as a finely divided powder conveyed in a low volume of argon gas carrier stream entering the reactor. In these proportions vanadium tetrachloride is in excess relative to magnesium reductant that could be oxidised in the reactor.

The addition of the reactants to the reactor increased the temperature in the reactor consistent with the exothermic nature of the reactions, reaching a steady bed temperature of 680° C. for an extended period.

The product stream from the reactor included free flowing black spheres (<3 mm diameter).

A sample from the product stream was taken and subjected to heating under prevailing conditions to remove metal halides and any excess magnesium left predominantly vanadium containing particles. Those skilled in the art would appreciate that with more extended operation that the titanium content of the composite particle and separated metal particle reduces to below detection levels.

Example 6

Zirconium

A reaction vessel made from stainless steel was purged with high purity argon and heated externally to 680° C. The system was charged with 200 grams of titanium composite particles as a seed material. The system was allowed to reach an internal temperature of 655° C. At this point reactant feeds were applied.

Zirconium tetrachloride was supplied at a rate of 211 grams per. In this example the reductant phase was magnesium metal, supplied at a rate of 40 grams per hour as a finely divided powder conveyed in a low volume of argon gas carrier stream entering the reactor. In these proportions zirconium tetrachloride is in excess relative to magnesium reductant fed into the reactor.

The addition of the reactants to the reactor increased the temperature in the reactor consistent with the exothermic nature of the reactions, reaching a steady bed temperature of 680° C. for an extended period.

The product stream from the reactor included free flowing black spheres (<3 mm diameter). Zirconium tetrachloride was observed in the exhaust gas stream of the reactor.

A sample from the product stream was taken and subjected to heating under prevailing conditions to remove metal halides and any excess magnesium left predominantly zirconium containing particles. Those skilled in the art would appreciate that with more extended operation that the titanium content of the composite particle and separated metal particle reduces to below detection levels.

Example 7

Ti—Al Composite with Mg as Reductant

A reaction vessel made from stainless steel was purged with high purity argon and heated externally to 680° C. The system was charged with 200 grams of titanium composite particles as a seed material. The system was allowed to reach an internal temperature of 655° C. At this point reactant feeds were applied.

Titanium tetrachloride was supplied at a rate of 424 grams per and aluminium chloride was supplied at a rate of 148 grams per hour. In this example the reductant phase was magnesium metal, supplied at a rate of 102 grams per hour as a finely divided powder conveyed in a low volume of argon gas carrier stream entering the reactor. In these proportions oxidant halides are in excess relative to magnesium reductant fed into the reactor.

The addition of the reactants to the reactor increased the temperature in the reactor consistent with the exothermic nature of the reactions, reaching a steady bed temperature of 680° C. for an extended period.

The product stream from the reactor included free flowing black spheres (<3 mm diameter). Oxidant halides were observed in the exhaust gas stream of the reactor.

A sample from the product stream was taken and subjected to heating under prevailing conditions to remove metal halides and any excess magnesium leaving behind titanium-aluminium containing particles. The composition of the sample is shown in Table 5.

TABLE 5

| Titanium-Aluminide | | | | | | | | | | |
| --- | --- | --- | --- | --- | --- | --- | --- | --- | --- | --- |
| Sum (%) | Ti % | Mg % | Al % | V % | As ppm | Bi ppm | Co ppm | Cr ppm | Fe ppm | Mn ppm |
| 95.4 | 82.4 | <0.002 0.17 | <0.002 12.6 | <0.002 0.01 | <20 58 | <20 <20 | <20 122 | <20 192 | <20 1578 | <20 629 |
| Mo ppm | Na Ppm | Nb ppm | Ni ppm | Pb ppm | Si ppm | Y ppm | Zr ppm | W ppm | Sn Ppm | |
| <20 <20 | <20 <20 | <20 <20 | <20 87 | <20 <20 | <20 215 | <20 <20 | <50 53 | <20 <20 | <20 n/a | |

Example 8

Production of Titanium Metal Composite in the Presence of Excess Oxidant with Unreacted Reductant Present in the Composite Below the Melting Point of the Reductant A reaction vessel made from stainless steel was purged with high purity argon and heated externally to 525° C. The system was charged with 2 kilograms of titanium composite particles as a seed material. The system was allowed to reach an internal temperature of 520° C. At this point reactant feeds were introduced.

Titanium tetrachloride was supplied at a rate of 1.2 kilograms per hour. In this example the reductant phase was magnesium metal, supplied at a rate of 300 grams per hour as a finely divided powder with a particle size between 50-63 µm and was conveyed in a low volume of argon gas carrier stream entering the reactor. In these proportions titanium tetrachloride is in excess by approximately 3.5 wt % relative to magnesium as the most electrochemically positive component that could be oxidised in the reactor.

The addition of the reactants to the reactor increased the temperature in the reactor consistent with the exothermic nature of the reactions, reaching a steady bed temperature of 550° C. for an extended period.

The product stream from the reactor included free flowing black spheres (<3 mm diameter). Titanium tetrachloride was observed in the exhaust gas stream of the reactor.

Under these conditions the reductant is solid and the oxidant is a vapour. This limits the reactivity of the reductant where the exterior shell of reductant particles reacts (~10-20 µm) based on each particles residence time in the reactor. As such, the core of reductant particles greater than the reaction shell remains in metallic form.

Heating of the composite particles from this run under prevailing conditions to remove the excess magnesium and magnesium chloride salt left titanium metal particles. The mass fraction of metal product to composite during this process is 16%.

Figure 4:
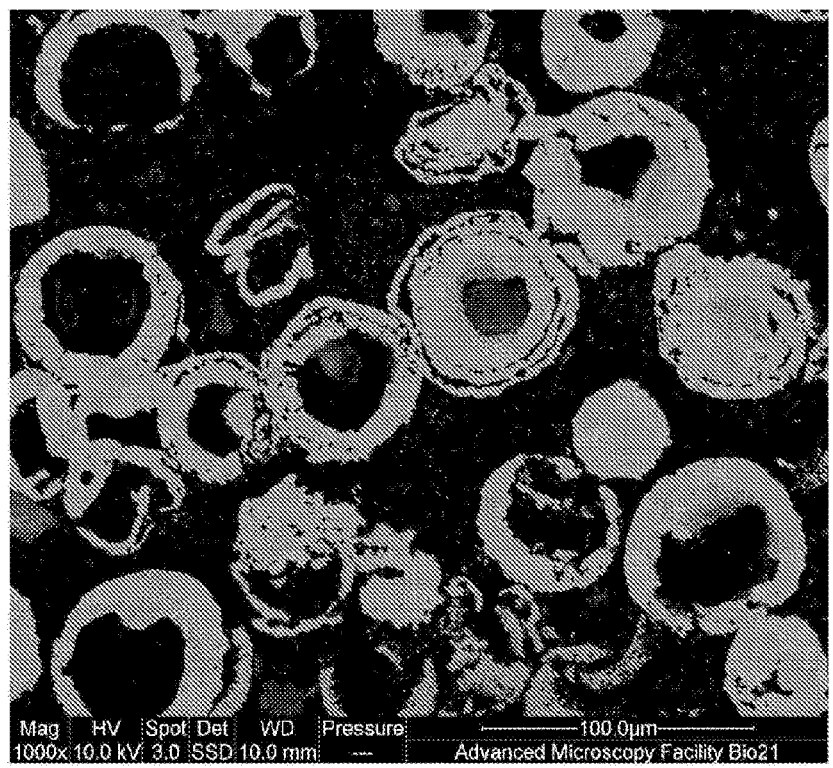
FIG. 4 shows a cross section of the metal particles following removal of volatile halides according to Example 8.

FIG. 4 shows a cross section of the metal particles following removal of volatile halides. It can be seen that the particles have a wall thickness of 10-20 µm and a hollow core of 20-40 µm. It is considered that the hollow core would have contained metallic magnesium prior to removal of volatiles. The composition of the bright phase is essentially 100% titanium.

This example shows that only a limited shell thickness of magnesium has been reacted and exemplifies the definition of the reductant to only include the material which is capable of being reduced in the prevailing conditions.

Example 9

Very High Excess of TiCl$_4$

A reaction vessel made from stainless steel was purged with high purity argon and heated externally to 525° C. The system was charged with 2 kilograms of titanium composite particles as a seed material as derived from the conditions prevailing from Example 8. The system was allowed to reach an internal temperature of 520° C. At this point reactant feeds were introduced.

Titanium tetrachloride was supplied at a rate of 1.2 kilograms per hour. In this example the reductant phase was magnesium metal, supplied at a rate of 10 grams per hour as a finely divided powder with a particle size between 50-63 µm and conveyed in a low volume of argon gas carrier stream entering the reactor. In these proportions titanium tetrachloride is in excess by approximately 3000 wt % relative to magnesium as the most electrochemically positive component that could be oxidised in the reactor.

The addition of the reactants to the reactor increased the temperature in the reactor consistent with a mild exothermic reaction, reaching a steady bed temperature of 530° C. Over a period of time the bed temperature reduced towards the starting temperature prior to feeds being introduced.

The product stream from the reactor included free flowing black/green spheres (<3 mm diameter). A significant quantity of titanium tetrachloride was observed in the exhaust gas stream of the reactor. The mass of material discharged from the reactor to maintain a constant reactor mass was greater than that would be expected for the conversion of the magnesium fed into the reactor if converted into composite material. This implies that titanium tetrachloride was being incorporated into the composite particles by reacting with compounds other than the fed magnesium.

Under these conditions the reductant is solid and the oxidant is a vapour. The feed rate of reductant into the reactor relative to the bed size increases the residence time significantly, providing a greater time for reactions to occur and the extent of reaction to increase, including for magnesium in the seed bed to be converted.

Figure 5:
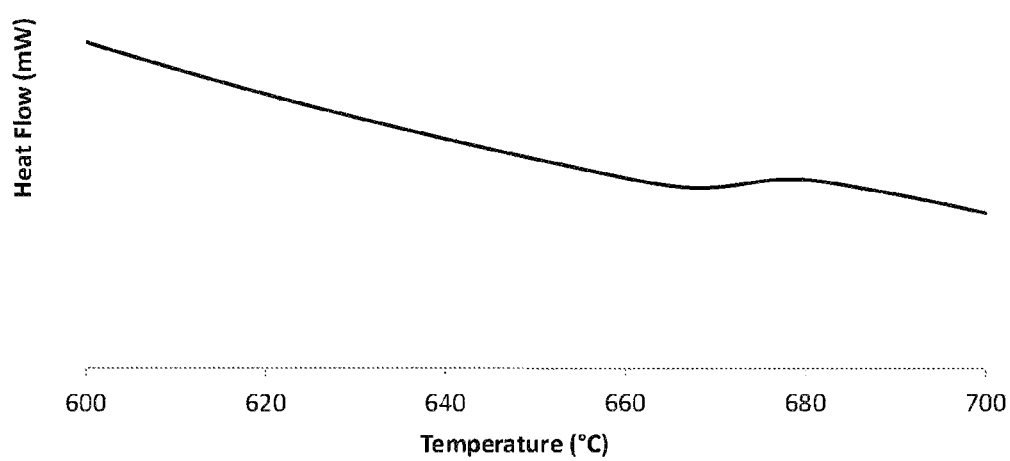
FIG. 5 shows the DTA thermogram of the composite particle of Example 9 around the temperature of 650° C. exhibiting no endotherm to indicate the presence of metallic magnesium.

FIG. 5 shows the DTA thermogram of the composite particle around the temperature of 650° C. exhibiting no endotherm to indicate the presence of metallic magnesium.

Heating of the composite particles from this run under prevailing conditions to remove the excess magnesium and magnesium chloride salt left titanium metal particles. The mass fraction of metal product to composite during this process is 12%.

The combination of no metallic magnesium in the composite and reduced metallic mass retained after removal of volatiles indicates an enhanced level of reaction of solid phase magnesium beyond the surface 10-20 µm with longer residence time in conditions of significant excess of oxidant. Also the formation of a significant portion of sub-halides present in the composite particle can be similarly confirmed.

Example 10

Aluminium as a Reductant

A reaction vessel made from stainless steel was purged with high purity argon and heated externally to 200° C. The system was charged with 2 kilograms of titanium composite particles formed under similar conditions previously as a seed material. The system was allowed to reach an internal temperature of 190° C. At this point reactant feeds were introduced.

Titanium tetrachloride was supplied at a rate of 1.2 kilograms per hour. In this example the reductant phase was aluminium metal, supplied at a rate of 150 grams per hour as a finely divided powder with a d$_{50}$ particle size of around 25 µm and was conveyed in a low volume of argon gas carrier stream entering the reactor. In these proportions titanium tetrachloride is in excess by approximately 50 wt % relative to aluminium as the most electrochemically positive component that could be oxidised in the reactor.

The addition of the reactants to the reactor increased the temperature in the reactor consistent with a minor exothermic nature of the reactions, reaching a steady bed temperature of 215° C. for an extended period.

The product stream from the reactor included fine black/grey particles (<1 mm diameter). Titanium tetrachloride was observed in the exhaust gas stream of the reactor.

Under these conditions the reductant is solid and the oxidant is a vapour. Also, the oxidised reductant ($AlCl_3$) is notionally a vapour at this temperature also and not available to form a part of the protective matrix for the reduced metal. In this example the titanium subhalides form part of the composite particle protective matrix.

Figure 6:
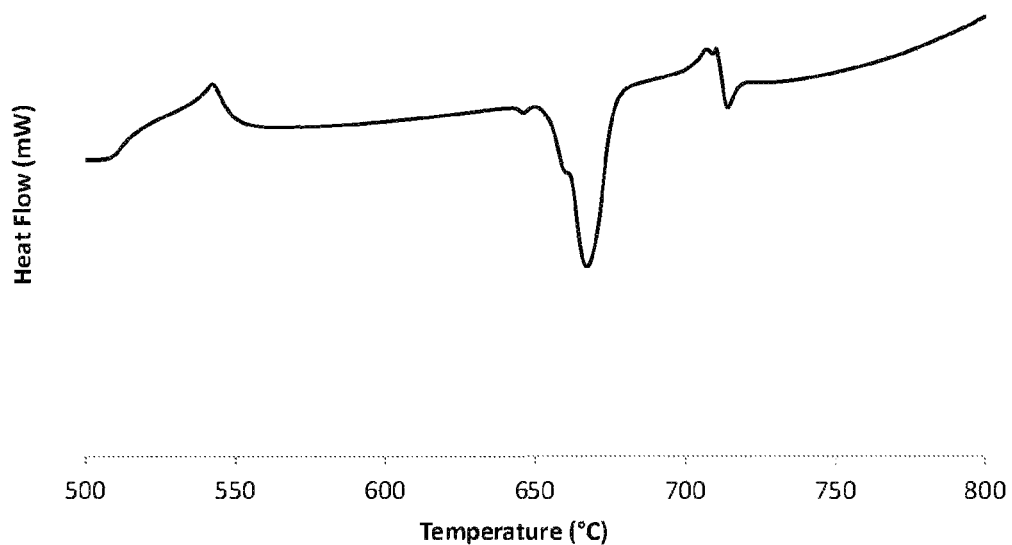
FIG. 6 shows a thermogram of the composite product of Example 10 surrounding the temperature of the melting point of aluminium of 660° C.

FIG. 6 shows a thermogram of the composite product surrounding the temperature of the melting point of aluminium of 660° C. A clear endotherm is observed indicating the presence of metallic aluminium consistent with analogous result in example 9. Exotherms are observed above and below the melting point of aluminium which are consistent with the formation of titanium aluminides.

Figure 7:
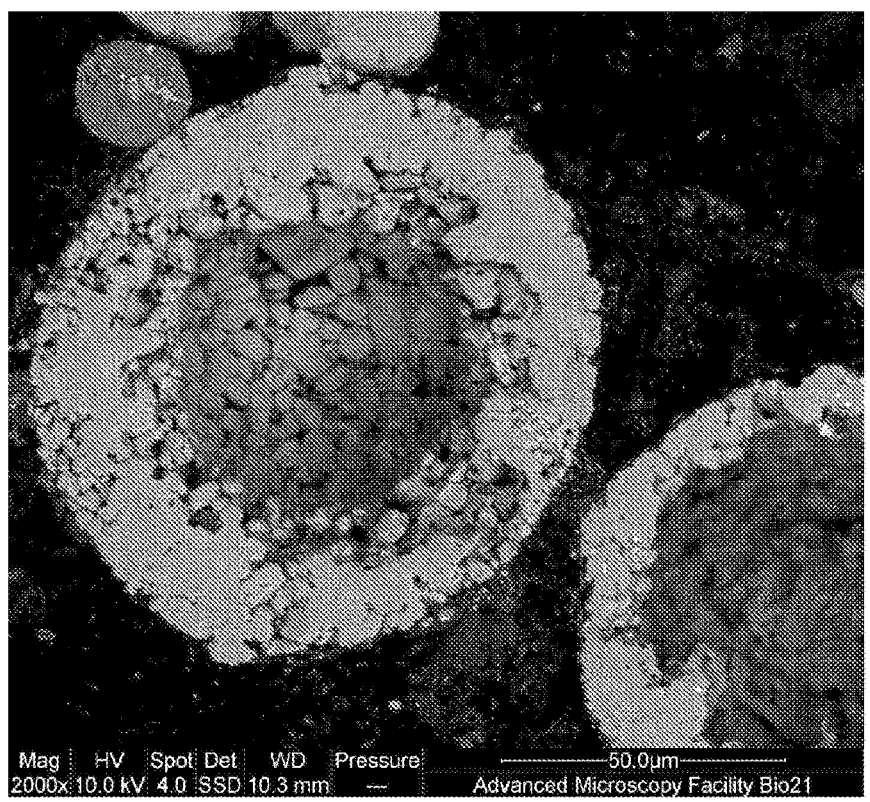
FIG. 7 shows a cross section of the metal particles of Example 10 following removal of volatile halides.

FIG. 7 shows a cross section of the metal particles following removal of volatile halides. The composition of the bright phase is 63% Aluminium and 27% Titanium, consistent with $TiAl_3$.

While the above examples primarily employ magnesium metal as the reductant, those in the art will appreciate that other metals, including but not limited to sodium, potassium, lithium and barium, would be expected to achieve similar results given their similar properties.

Unless the context requires otherwise or specifically stated to the contrary, integers, steps or elements of the invention recited herein as singular integers, steps or elements clearly encompass both singular and plural forms of the recited integers, steps or elements.

It will be appreciated that the foregoing description has been given by way of illustrative example of the invention and that all such modifications and variations thereto as would be apparent to persons of skill in the art are deemed to fall within the broad scope and ambit of the invention as herein set forth.

The invention claimed is:

1. A solid composite material comprising:
a matrix of oxidised reductant ($R_o$), wherein said oxidised reductant ($R_o$) comprises a metal halide ($M_RX$) selected from the group consisting of $MgCl_2$, NaCl, KCl, LiCl, $BaCl_2$, $CaCl_2$, $BeCl_2$, $AlCl_3$ and any combination thereof;
a product metal ($M_P$) dispersed in said matrix of oxidised reductant ($R_o$); and
(i) one or more metal compounds ($M_PC_R$) of said product metal ($M_P$) in one or more oxidation states, and optionally (ii) a reductant (R);
wherein said one or more metal compounds ($M_PC_R$) of said product metal ($M_P$) in one or more oxidation states comprise one or more metal halides ($M_PX$) of said metal component ($M_P$);
wherein said product metal ($M_P$) is selected from the group consisting of titanium, aluminium, vanadium, chromium, niobium, molybdenum, zirconium, silicon, boron, tin, hafnium, yttrium, iron, copper, nickel, bismuth, manganese, palladium, tungsten, cadmium, zinc, silver, cobalt, tantalum, scandium, ruthenium and the rare earths or a combination of any two or more thereof.

2. A solid composite material according to claim 1, wherein said solid composite material comprises up to 20 wt % of said reductant (R).

3. A solid composite material according to claim 1, wherein said product metal ($M_P$) comprises at least two of titanium, aluminium and vanadium.

4. A solid composite material according to claim 1, wherein said reductant (R) is selected from the group consisting of Mg, Na, K, Li, Ba, Ca, Be, Al and any combination thereof.

5. A solid composite material according to claim 1, wherein said composite material is in the form of particles having an average particle size of up to 500 μm.

6. The solid composite material according to claim 5, wherein said composite material is in the form of particles having an average particle size of from 20-300 μm.

* * * * *